US012523361B2

(12) United States Patent
Yan et al.

(10) Patent No.: US 12,523,361 B2
(45) Date of Patent: Jan. 13, 2026

(54) LIGHT STAND AND LIGHT

(71) Applicant: TILTA INC., Burbank, CA (US)

(72) Inventors: Yaxiong Yan, Shenzhen (CN); Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/794,753

(22) Filed: Aug. 5, 2024

(65) Prior Publication Data

US 2025/0320989 A1 Oct. 16, 2025

(51) Int. Cl.

*F21V 21/15* (2006.01)
*F21V 21/30* (2006.01)
*F21W 131/406* (2006.01)

(52) U.S. Cl.

CPC .............. *F21V 21/15* (2013.01); *F21V 21/30* (2013.01); *F21W 2131/406* (2013.01)

(58) Field of Classification Search

CPC .... F21W 2131/406; F21V 21/15; F21V 21/30
See application file for complete search history.

(56) References Cited

U.S. PATENT DOCUMENTS

2019/0234587 A1* 8/2019 Ohara .................. F21V 21/406

FOREIGN PATENT DOCUMENTS

CN 217356756 U 9/2022
CN 220688941 U 3/2024

* cited by examiner

*Primary Examiner* — Sean P Gramling
(74) *Attorney, Agent, or Firm* — LOZA & LOZA, LLP; Derek Yeung

(57) ABSTRACT

The present disclosure relates to the technical field of lighting, particularly to a light stand and a light. The light stand comprises: a base, a first support component, and a second support component. The base features a first opening and a second opening at its opposing ends. The first support component is designed to be installed in the first opening and equipped with a first meshing component. Similarly, the second support component fits into the second opening and is furnished with a second meshing component. Interposed between the first and second meshing components is a linkage member that meshes with both components. The linkage member engages with the first meshing component and the second meshing component, respectively, through the coordinated interaction among the first meshing component and the second meshing component and the linkage member, promoting balanced force distribution between them.

11 Claims, 7 Drawing Sheets

LIGHT STAND AND LIGHT

CROSS-REFERENCE TO RELATED APPLICATIONS

The present application for patent claims priority to and the benefit of pending Chinese Application No. 2024207951242, filed Apr. 12, 2024, and hereby expressly incorporated by reference herein as if fully set forth below in its entirety and for all applicable purposes.

TECHNICAL FIELD

This application relates to the technical field of lighting, specifically to a light stand and a light.

INTRODUCTION

In photography, staging, and various other scenarios, it is often necessary to install lights to augment illumination in diverse areas. A significant number of lamps utilized in these settings require the capability to adjust their pitch angle and illumination direction based on the specific situation. Additionally, it is frequently necessary to change lamps with matching parameters according to on-site conditions. Consequently, a light stand with a dual-support structure is commonly employed as a fixture for the light source. Since the light source is affixed between two supports, its movement exerts a considerable force on both supports. Therefore, during installation, it is imperative to balance the force exerted on both supports to prevent uneven distribution, which could readily lead to the light stand tilting or even collapsing during movement.

BRIEF SUMMARY

This patent application presents a light stand and a light designed to address the issue of unbalanced force distribution on supports during the installation of a light source on conventional light stands, which often leads to a deviation of the center of gravity.

An aspect of the disclosure presents a light stand that comprises: a base, a first support component, and a second support component. The base features a first opening and a second opening at its opposing ends. The first support component is designed to be installed in the first opening and equipped with a first meshing component. Similarly, the second support component fits into the second opening and is furnished with a second meshing component. Interposed between the first and second meshing components is a linkage member that meshes with both components.

An aspect of the disclosure presents one end of the first support component comprising: a first connection part installed in the first opening, and one end of the second support component comprises a second connection part installed in the second opening; and the first meshing component is fixed to the first connection part, and the second meshing component is fixed to the second connection part.

An aspect of the disclosure presents the first connection part comprising: a first fixing groove for fixedly installing the first meshing component and a first accommodating groove for accommodating the second meshing component, and the first accommodating groove comprises at least one first limiting member for limiting the second meshing component; and the second connection part comprises a second fixing groove for fixedly installing the second meshing component and a second accommodating groove for accommodating the first meshing component, and the second accommodating groove comprises at least one a second limiting member for limiting the first meshing component.

An aspect of the disclosure presents the linkage member comprising a gear and a gear fixing shaft; a first end of the gear fixing shaft is fixed to the base, and a second end of the gear fixing shaft is movably connected to the gear.

An aspect of the disclosure presents a gear accommodating groove for accommodating the gear, which is provided at a point of connection between the first connection part and the second connection part.

An aspect of the disclosure presents the first meshing component comprising a first rack, and the second meshing component comprises a second rack.

An aspect of the disclosure presents the first rack and the second rack that are arranged in parallel, and the gear is disposed between the first rack and the second rack.

An aspect of the disclosure presents the base comprising a base body and a locking assembly; the first connection part and the second connection part are respectively sleeved into the first opening and the second opening located at opposite ends the base body; the locking assembly is arranged on the base body and is configured to lock the base body to the first connection part and the second connection part.

An aspect of the disclosure presents the locking assembly comprising at least one fast locking fastener that comprises an eccentric locking handle and a fixed post disposed between two eccentric wheels of the eccentric locking handle.

An aspect of the disclosure presents the base body further comprising a protective cover plate, the first end of the gear fixing shaft is fixed to the protective cover plate, and the second end of the gear fixing shaft is movably connected to the gear; and the base body comprises an installation opening that aligns with the protective cover plate.

An aspect of the disclosure presents a light that comprises the light stand according to any one of claims of the present disclosure and a light source disposed between the first support component and the second support component.

According to the above-mentioned embodiment that presents a light stand, comprising a base, a first support component, and a second support component. The base features a first opening and a second opening at its opposing ends. The first support component is designed to be installed in the first opening and equipped with a first meshing component. Similarly, the second support component fits into the second opening and is furnished with a second meshing component. Interposed between the first and second meshing components is a linkage member that meshes with both components. The linkage member engages with the first meshing component and the second meshing component, respectively, through the coordinated interaction among the first meshing component and the second meshing component and the linkage member. This engagement ensures that the first and second support components maintain a symmetrical center of gravity without deviation, promoting balanced force distribution between them. Consequently, it mitigates safety risks associated with unbalanced forces.

Figure 1:
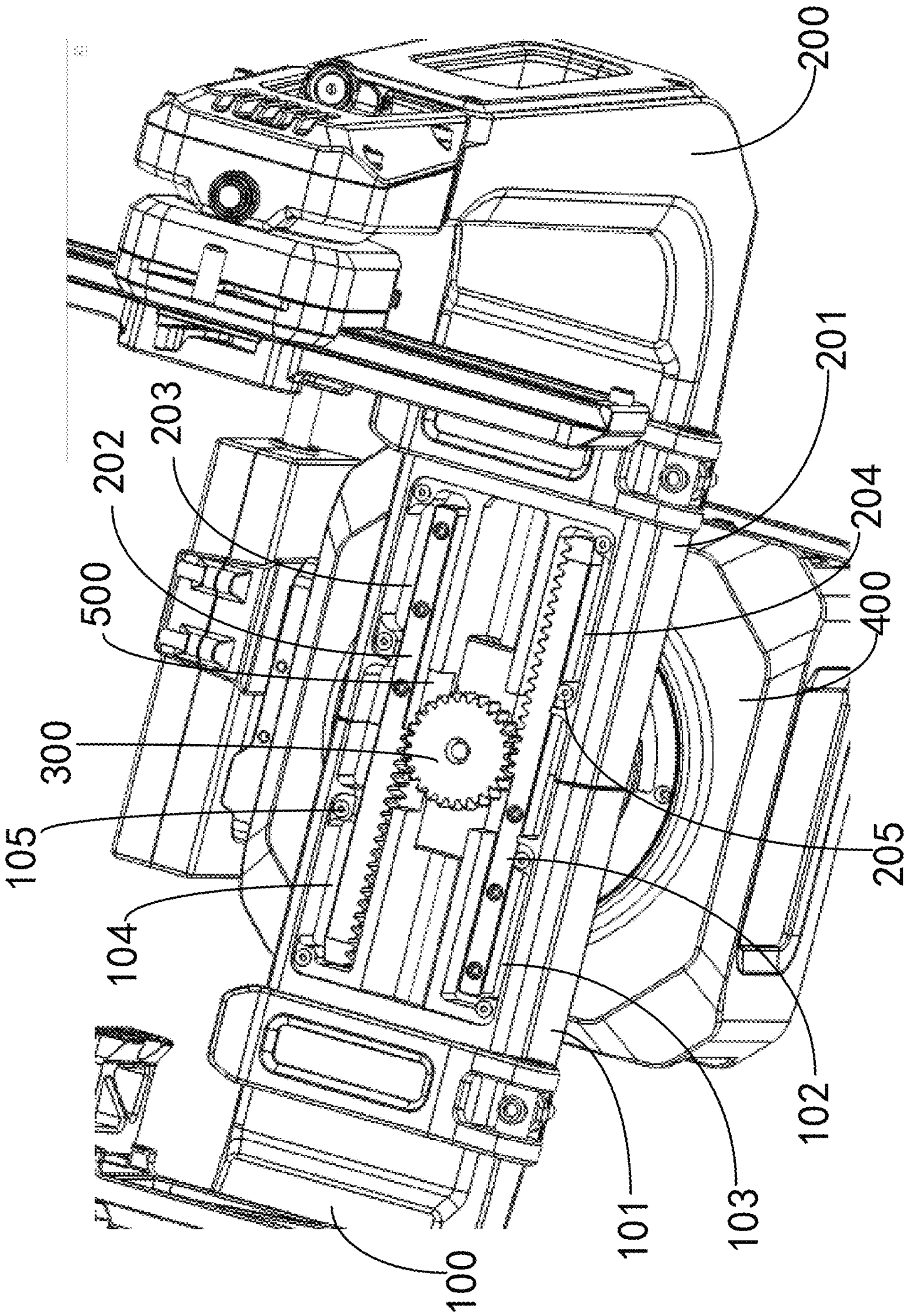
FIG. 1 is a schematic diagram of a light stand according to some aspects of the disclosure.

Reference numerals of the attached drawing are as follows:

100—First support component, 200—Second support component, 102—First rack, 300—Gear, 202—Second rack, 101—First connection part, 201—Second connection part, 400—Base, 301—Gear fixing shaft, 302—Protective cover plate, 103—First fixing groove, 104—First accommodating groove, 105—First limiting member, 203—Second fixing groove, 204—Second accommodating groove, 205—Second limiting member, 500—Gear accommodating groove, 401—Base body, 4011—Compression plate, 402—Eccentric locking handle, 4021—Eccentric wheels 4021, 403—Fixed column, 404—Installation opening, 405—First opening; 406—Second opening.

DETAILED DESCRIPTION

Herein, a further elaboration of the present disclosure is provided through concrete embodiments accompanied by the attached figures. Similar components across different embodiments are labeled consistently. While numerous details are provided to facilitate comprehension, experts in the field will readily recognize that certain features may be omitted in specific situations or substituted with alternative components, materials, or methods. In some instances, certain operations related to this application are omitted from the specification to avoid overwhelming the core aspects with excessive descriptions. For those skilled in the art, a detailed description of these related operations is not necessary as they can fully comprehend the operations based on the provided specifications and general technical knowledge in this domain.

Furthermore, the characteristics, operations, or features described herein can be combined in various suitable ways to yield diverse embodiments. Similarly, the steps or actions outlined in the methods can be sequenced or adjusted in manners evident to those skilled in the art. Therefore, the sequences depicted in the specification and figures are solely meant to clarify a particular embodiment and do not indicate a necessary order, unless specified otherwise.

The numbering used for components, such as “First” and “Second,” serves solely to distinguish between described objects and does not convey any sequential or technical significance. Unless otherwise specified, the terms “connection” and “linkage” encompass both direct and indirect connections (linkages).

Referring to FIGS. 1 to 7, where FIG. 1 is a diagram of a light stand according to some aspects of the disclosure. The light stand includes: a base 400, a first support component 100, and a second support component 200. The base 400 features a first opening 405 and a second opening 406 at opposing ends of the base. The first support component 100 is designed to be installed in the first opening 405 and equipped with a first meshing component. Similarly, the second support component 200 fits into the second opening 406 and is furnished with a second meshing component. Interposed between the first and second meshing components is a linkage member that meshes with both components.

In some aspects, the light stand includes a first support component 100 and a second support component 200. The first support component 100 and the second support component 200 have interconnecting pieces extending towards each other for mutual connection of the supports on both sides. Common structures of the supports include but are not limited to L-shaped and T-shaped, as exemplified in FIG. 1 with an L-shaped support. To accommodate various sizes of lights, the interconnecting pieces of the first support component 100 and the second support component 200 can also be movably connected, allowing for adjustment of the distance between the first support component 100 and the second support component 200. Since the interconnecting pieces of the first support component 100 and the second support component 200 are movably connected, a base 400 is used to securely fasten them together beneath the interconnecting pieces, subsequently linking to the light stand’s fixing mechanism.

In some aspects, to ensure symmetry during installation, disassembly, or adjustment of the first support component 100 and the second support component 200, and thereby maintaining the center of gravity of the light stand on its axis of symmetry, a first meshing component is fixed to a first connection part 101 of the first support component 100, and a second meshing component is fixed to a second connection part 201 of the second support component 200. Additionally, a linkage member is provided between the first meshing component and the second meshing component for engagement. This setup ensures that when one support moves, the other synchronously moves in the opposite direction under the engagement action of the meshing components and the linkage member, preserving symmetry of the supports on both sides and maintaining the bracket’s center of gravity on its axis of symmetry.

In some aspects, one end of the first support component 100 installed in the first opening 405 is a first connection part 101, and one end of the second support component 200 installed in the second opening 406 is a second connection part 201. The first meshing component is fixed to the first connection part 101, and the second meshing component is fixed to the second connection part 201.

As illustrated in FIG. 1, the first connection part 101 of the first support component 100 is fitted into the first opening 405, while the second connection part 201 of the second support component 200 is installed in the second opening 406. The first and second meshing components, which engage via the linkage member, are fixed to their respective interconnecting pieces. The meshing components may have overlapping parts, as shown in FIG. 1, either extending from the interconnecting pieces or from the meshing components themselves separately. The length of these overlapping parts can be adjusted based on specific requirements.

In some aspects, the first connection part 101 is provided with a first fixing groove 103 for fixedly installing the first meshing component and a first accommodating groove 104 for accommodating the second meshing component, and the first accommodating groove 104 is provided with at least one first limiting member 105 for limiting the second meshing component. The second connection part 201 is provided with a second fixing groove 203 for fixedly installing the second meshing component and a second accommodating groove 204 for accommodating the first meshing component, and the second accommodating groove 204 is provided with at least one second limiting member 205 for limiting the first meshing component.

Referring to FIG. 1, in some aspects, the overlapping sections of the first and second meshing components can protrude beyond the first connection part 101 and the second connection part 201, which secure the respective meshing components. In this connection structure, the first connection part 101 features a first fixing groove 103 designed to securely hold the first meshing component, while the second connection part 201 includes a second fixing groove 203 for holding the second meshing component. When the extremities of the meshing components extend past their respective interconnecting pieces, accommodation grooves are necessary. Since the meshing components will engage with the linkage member by inserting into the opposite interconnecting piece, the first connection part 101 includes a first accommodating groove 104 for the second meshing component, and the second connection part 201 has a second accommodating groove 204 for the first meshing component. Additionally, to prevent deviation during the engagement and movement of the meshing components and the linkage member, especially when the movement range is extensive, at least one first limiting member 105 is positioned within the first accommodating groove 104 of the first connection part 101 to restrict the second meshing component. As illustrated in FIG. 1, this first limiting member 105 protrudes from the side wall of the first accommodating groove 104. Similarly, the second accommodating groove 204 of the second connection part 201 includes at least one second limiting member 205 to limit the first meshing component, which protrudes from the side wall of the second accommodating groove 204 as illustrated in FIG. 1. In some aspects, the connection between the first and second connection parts 101 and 201 can be achieved through a planar joint as shown in FIG. 1 or via a finger joint method, where the ends of the interconnecting pieces are interconnected in a finger-like fashion.

Figure 2:
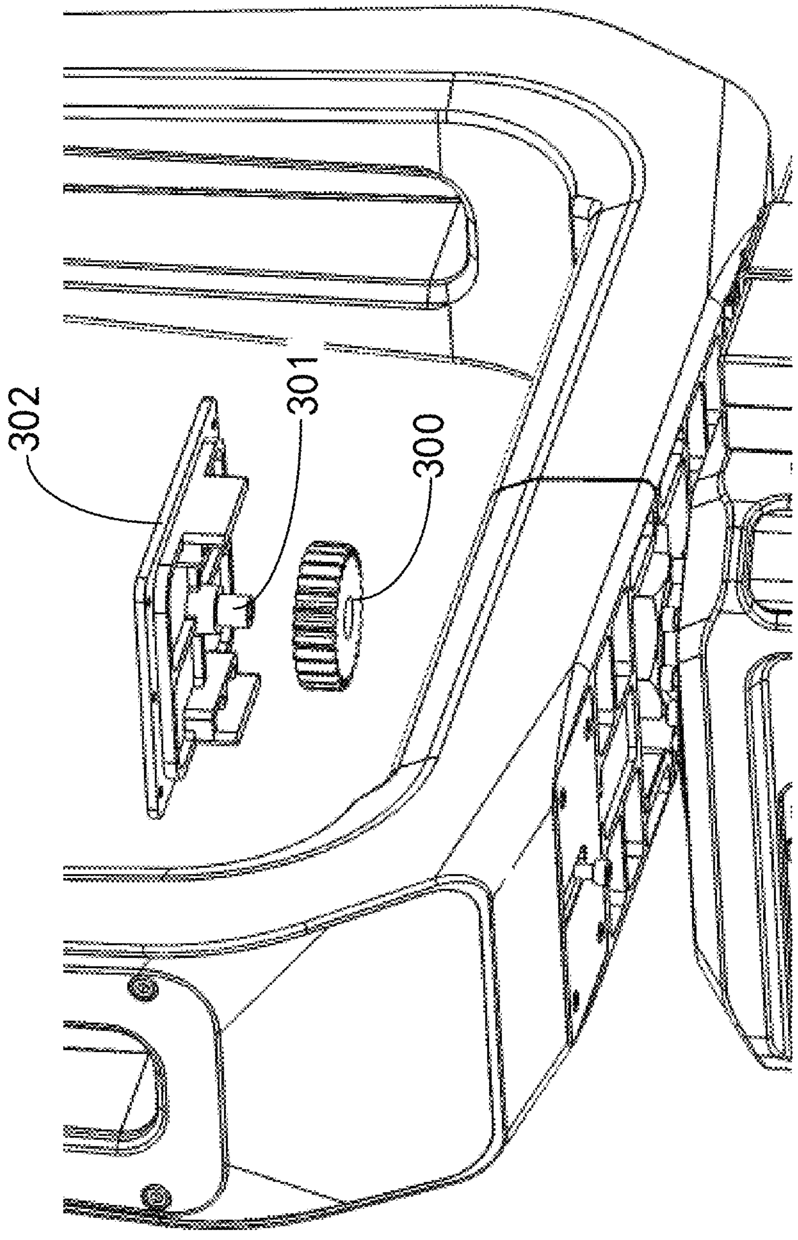
FIG. 2 is an exploded view of a light stand at a gear position according to some aspects of the disclosure.

Referring to FIGS. 1 and 2, the linkage member includes a gear 300 movably connected to a gear fixing shaft 301. One end of the gear fixing shaft 301 is anchored to the base 400, while the other end allows the gear 300 to rotate. The position of the gear 300 is secured by the gear fixing shaft 301, preventing any displacement during engagement that could hinder the operation of the engagement mechanism. In some aspects, the gear fixing shaft 301 can be located on the protective cover plate 302 (as seen in FIG. 2) or other parts of the base 400, such as beneath the gear 300 on the opposite side of the protective cover plate 302, positioned between the first and second meshing components.

In some aspects, a gear accommodating groove 500 for accommodating the gear 300 is provided at the connection between the first connection part 101 and the second connection part 201.

In some aspects, the first meshing component is a first rack 102, and the second meshing component is a second rack 202; the first rack 102 and the second rack 202 are arranged in parallel, and the gear 300 is disposed between the first rack 102 and the second rack 202.

As depicted in FIG. 1, the first connection part 101 features a first fixing groove 103 to securely mount a first rack 102 and a first accommodating groove 104 to house the protruding section of a second rack 202. Likewise, the second connection part 201 has a second fixing groove 203 for the second rack 202 and a second accommodating groove 204 for the extending part of the first rack 102. A gear accommodating groove 500, formed by grooves in both the first and second connection parts 101 and 201, is provided at their junction to accommodate the gear 300. The first rack 102 and the second rack 202 are aligned parallel to each other, with the gear 300 positioned between them. This configuration ensures that when one support moves, the engagement between the first and second racks and the gear 300 drives the other support in the opposite direction.

In some aspects, the base 400 includes a base body 401 and a locking assembly (including an eccentric locking handle 402 and a fixed post 403 at each end). The first connection part 101 and the second connection part 201 can be respectively sleeved into the first opening 405 and the second opening 406 of the base body 401. The locking assembly is arranged on the base body 401 and is used to lock the base body 401 to achieve a fixed connection of the base body 401 with the first connection part 101 and the second connection part 201.

Figure 3:
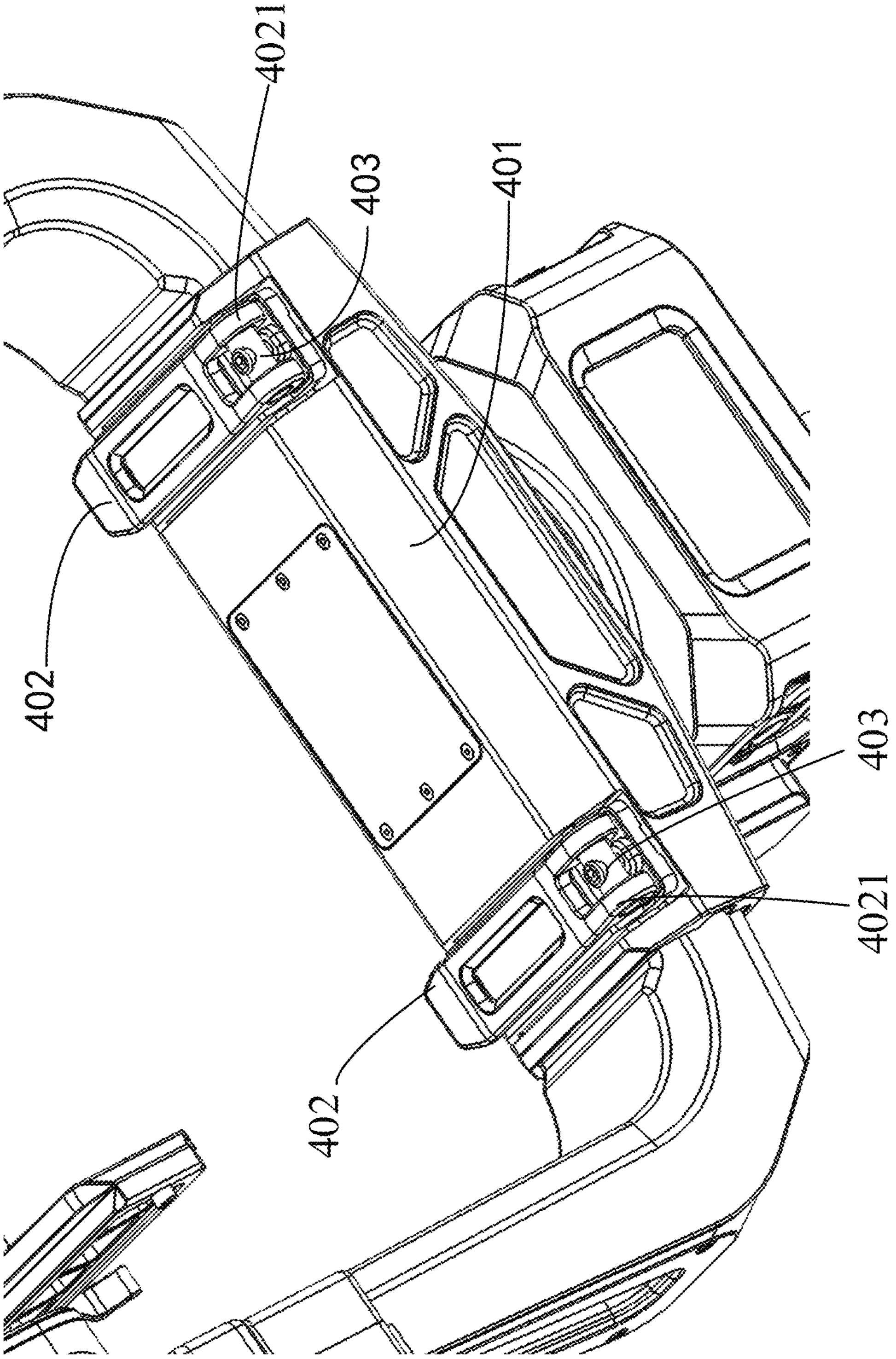
FIG. 3 is a schematic diagram of the base structure of a light stand according to some aspects of the disclosure.

Referring to FIG. 3, it illustrates the base 400 for a light stand in an alternative embodiment. The base 400 includes a base body 401 that is fitted with the first connection part 101 and the second connection part 201. A locking mechanism is integrated into the base body 401, facilitating the secure attachment or release of the first and second connection parts 101 and 201. This locking mechanism may encompass, but is not restricted to, quick-lock fasteners and bolt lock fasteners.

In some aspects, the locking assembly includes at least one quick-lock fastener, which can include an eccentric locking handle 402 and a fixed post 403 disposed between two eccentric wheels 4021 of the eccentric locking handle 402.

As depicted in FIG. 3, the locking mechanism can take the form of a quick-lock fastener. Specifically, two such fasteners are mounted on the base body 401. Each quick-lock fastener includes an eccentric locking handle 402, with the eccentric wheels 4021 at its end connected to the base body 401 via a fixed post 403. As depicted in FIG. 3, the base body 401 is provide with a compression plate 4011 (see FIG. 6), and when the eccentric locking handle 402 is locked, the two eccentric wheels 4021 of the eccentric locking handle 402 press the compression plate 4011, thereby causing the compression plate 4011 to press the first connection part 101 and the second connection part 201.

In some aspects, the base body 401 further includes a protective cover plate 302, one end of the gear fixing shaft 301 is fixed to the protective cover plate 302, and the other end is movably connected to the gear 300; The base body 401 features an installation opening 404 designed to align with the protective cover plate at the protective cover plate's location.

Figure 4:
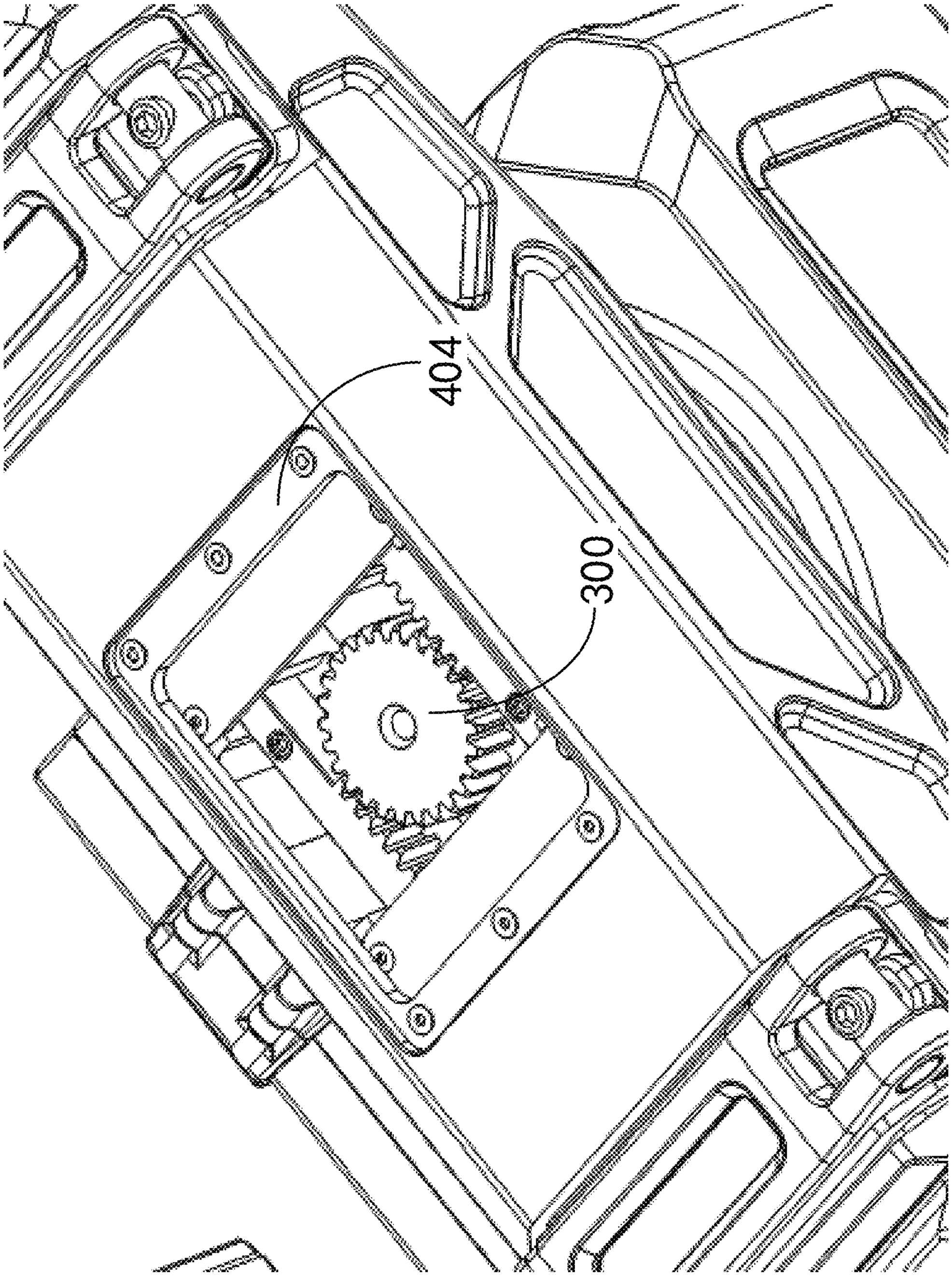
FIG. 4 is a schematic diagram of a base body of a light stand with a protective cover of the gear removed according to some aspects of the disclosure.
Figure 5:
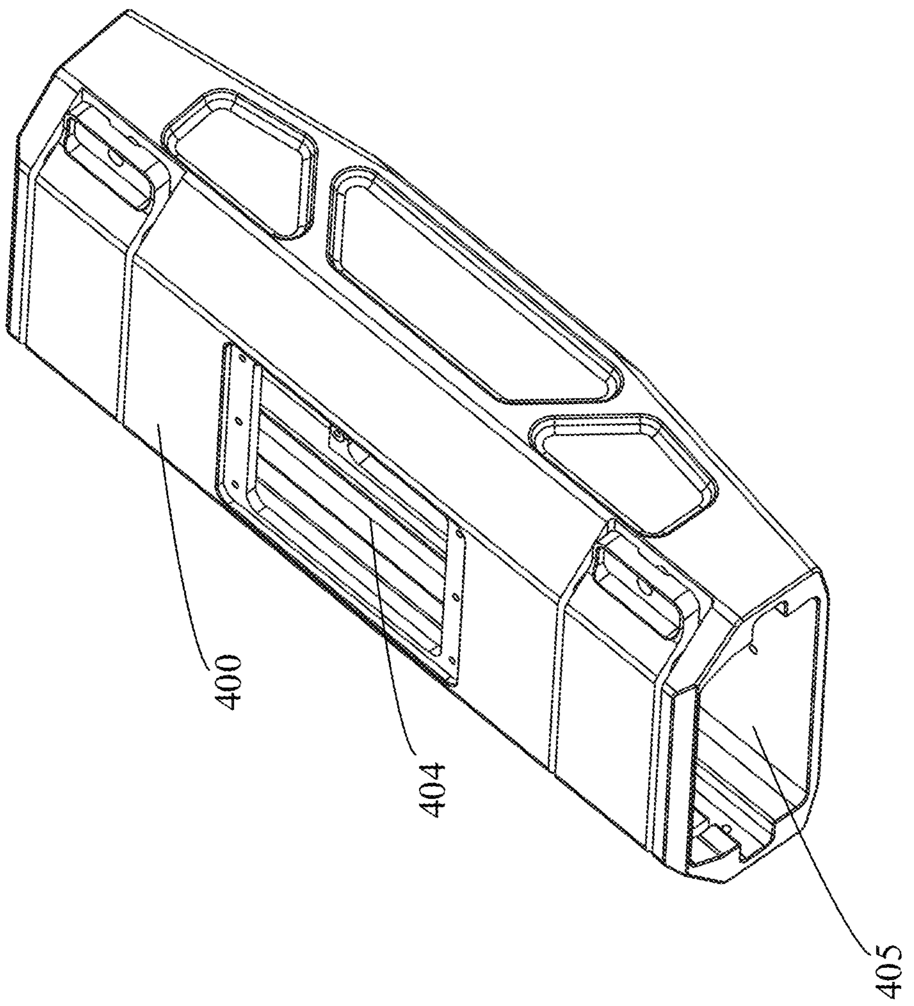
FIG. 5 is a schematic diagram of the light stand at a first opening according to some aspects of the disclosure.
Figure 6:
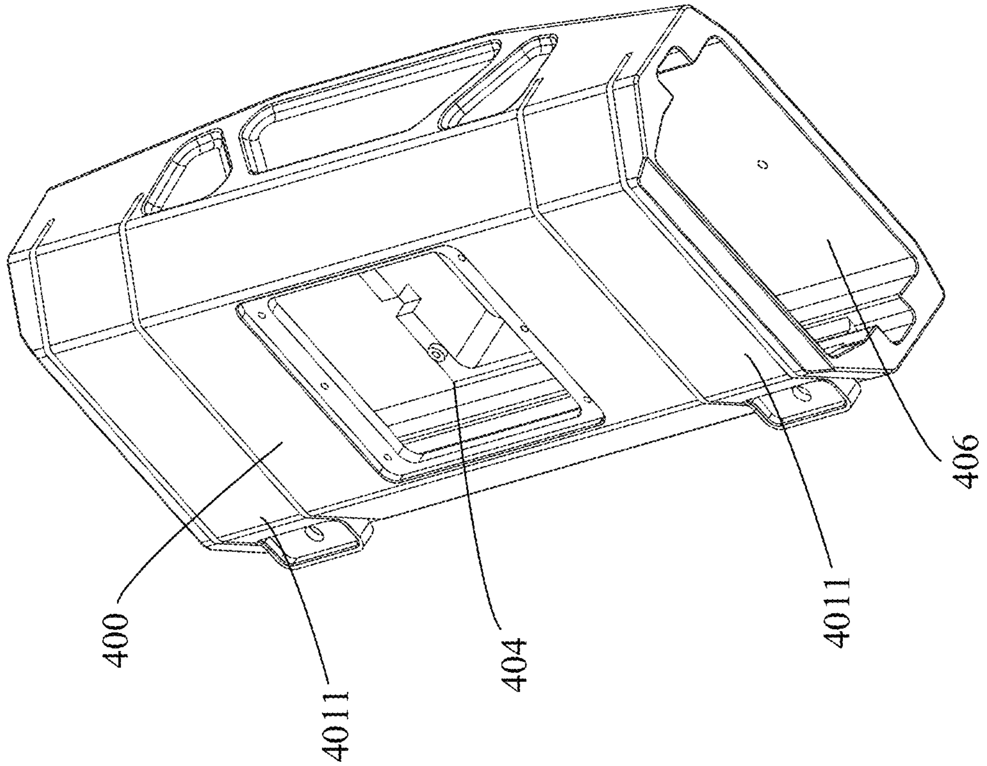
FIG. 6 is a schematic diagram of the light stand at a second opening according to some aspects of the disclosure.

With reference to FIGS. 2 through 4, FIG. 4 depicts a portion of the base body 401 with the protective cover plate 302 of the gear 300 removed. The base body 401 additionally features a protective cover plate 302 and a corresponding installation opening 404. The protective cover plate 302 serves to stabilize the gear fixing shaft 301. This design allows the protective cover plate 302 to be removably attached to the base body 401, simplifying the disengagement of the first and second meshing components when the cover plate 302 is removed.

In some aspects, the length of the first accommodating groove 104 corresponds to the second preset length of the second meshing component protruding from the second connection part 201, while the length of the second accommodating groove 204 matches the first preset length of the first meshing component protruding from the first connection part 101.

As illustrated in FIG. 1, the length of the first accommodating groove 104 is equivalent to the second preset length of the second rack 202 extending from the second connection part 201, while the length of the second accommodating groove 204 is equivalent to the first preset length of the first rack 102 extending from the first connection part 101.

In some aspects, the opposing sides of the first rack 102 and the second rack 202 are furnished with teeth. Given that the gear 300 is positioned between the first rack 102 and the second rack 202, only the teeth facing the gear 300 function. Therefore, teeth can be placed solely on the opposing sides of the first rack 102 and the second rack 202 to reduce the production cost of the racks.

In some aspects, the first track and second rack have teeth only on the protruding portions of the first rack 102 from the first connection part 101 and the protruding portions of the second rack 202 from the second connection part 201. Referring to FIG. 1, one end of the first rack 102 is affixed to the first connection part 101, while one end of the second rack 202 is attached to the second connection part 201. The actual meshing areas between the gear 300 and the first rack 102, as well as the second rack 202, correspond to the protruding portions of these racks from their respective interconnecting pieces. Consequently, teeth need only be placed on these protruding portions to further reduce the production cost of the racks.

Figure 7:
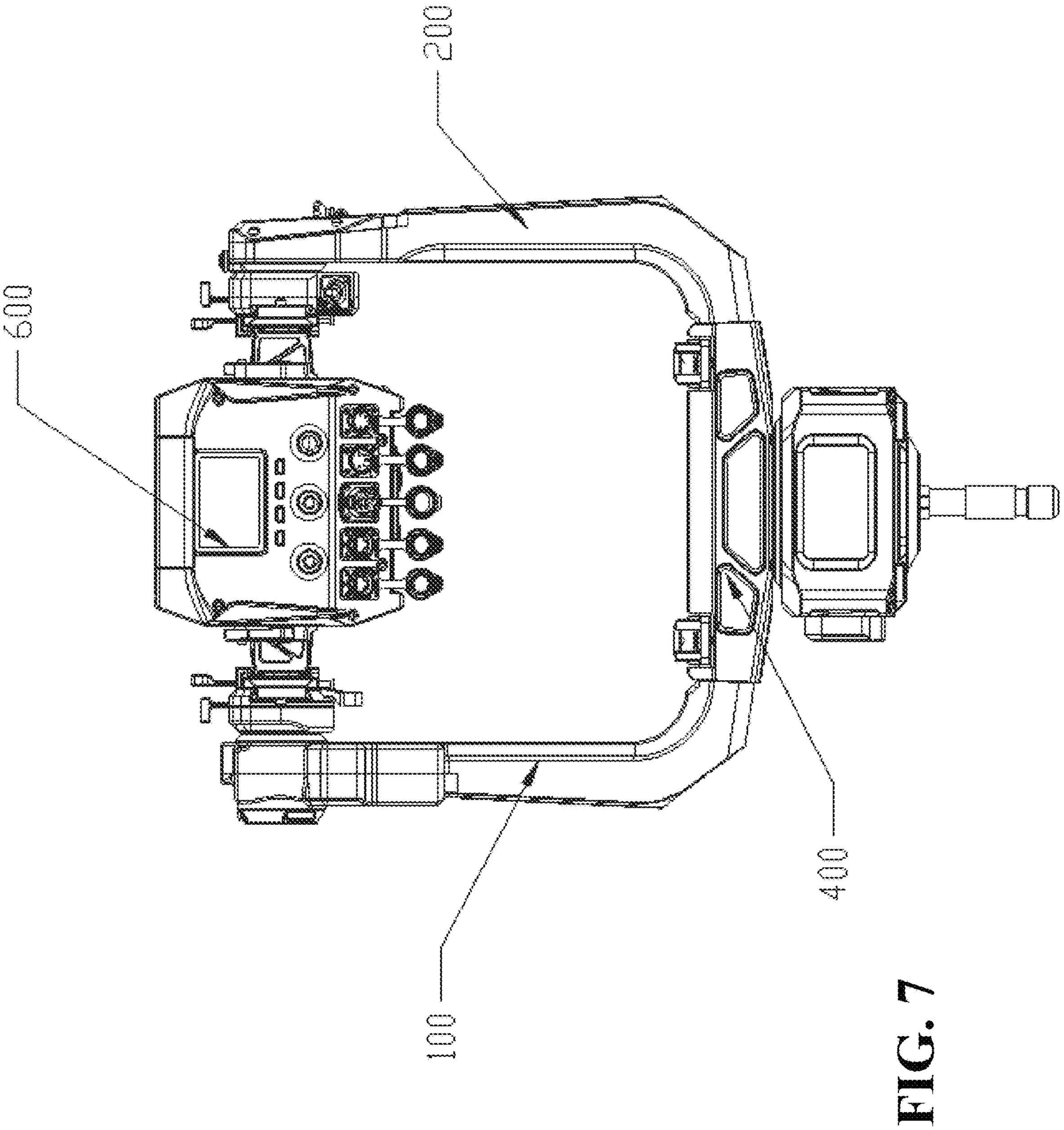
FIG. 7 is a schematic diagram of a light according to some aspects of the disclosure.

In some aspects, referring to FIG. 7, a light is also presented, including a light stand as disclosed in this disclosure and a light source. The light source is securely mounted between the first support component 100 and the second support component 200 of the light stand.

The examples provided above serve to illustrate the present disclosure for a better understanding and are not intended to limit its scope. Technicians in the field can derive several simple deductions, modifications, or substitutions based on the core principles of the present disclosure.

What is claimed is:

1. A light stand, comprising:

a base comprising a first opening and a second opening at opposing ends of the base respectively;

a first support component, mounted at the first opening and equipped with a first meshing component;

a second support component, mounted at the second opening and equipped with a second meshing component; and a linkage member provided between the first meshing component and the second meshing component, the linkage member meshed with both the first meshing component and the second meshing component, wherein the first support component and the second support component are configured to synchronously move in opposite directions via an engagement action involving the first meshing component, the second meshing component, and the linkage member.

2. The light stand according to claim 1, wherein one end of the first support component comprises a first connection part installed in the first opening, and one end of the second support component comprises a second connection part installed in the second opening; and the first meshing component is fixed to the first connection part, and the second meshing component is fixed to the second connection part.

3. The light stand according to claim 2, wherein the linkage member comprises a gear and a gear fixing shaft; and a first end of the gear fixing shaft is fixed to the base, and a second end of the gear fixing shaft is movably connected to the gear.

4. The light stand according to claim 3, wherein a gear accommodating groove for accommodating the gear is provided at a point of connection between the first connection part and the second connection part.

5. The light stand according to claim 3, wherein the first meshing component comprises a first rack, and the second meshing component comprises a second rack.

6. The light stand according to claim 5, wherein the first rack and the second rack are arranged in parallel, and the gear is disposed between the first rack and the second rack.

7. The light stand according to claim 3, wherein the base comprises a base body and a locking assembly;

the first connection part and the second connection part are respectively sleeved into the first opening and the second opening located at opposite ends the base body; and the locking assembly is arranged on the base body and is configured to lock the base body to the first connection part and the second connection part.

8. The light stand according to claim 7, wherein the locking assembly comprises at least one fast locking fastener that comprises an eccentric locking handle and a fixed post disposed between two eccentric wheels of the eccentric locking handle.

9. The light stand according to claim 7, wherein the base body further comprises a protective cover plate, the first end of the gear fixing shaft is fixed to the protective cover plate, and the second end of the gear fixing shaft is movably connected to the gear; and the base body comprises an installation opening that aligns with the protective cover plate.

10. A light, comprising the light stand according to claim 1 and a light source disposed between the first support component and the second support component.

11. A light stand, comprising:

a base comprising a first opening and a second opening at opposing ends of the base respectively;

a first support component, mounted at the first opening and equipped with a first meshing component;

a second support component, mounted at the second opening and equipped with a second meshing component; and a linkage member provided between the first meshing component and the second meshing component, the linkage member meshed with both the first meshing component and the second meshing component, wherein one end of the first support component comprises a first connection part installed in the first opening, and one end of the second support component comprises a second connection part installed in the second opening;

wherein the first meshing component is fixed to the first connection part, and the second meshing component is fixed to the second connection part;

wherein the first connection part comprises a first fixing groove for fixedly installing the first meshing component and a first accommodating groove for accommodating the second meshing component, and the first accommodating groove comprises at least one first limiting member for limiting the second meshing component; and wherein the second connection part comprises a second fixing groove for fixedly installing the second meshing component and a second accommodating groove for accommodating the first meshing component, and the second accommodating groove comprises at least one a second limiting member for limiting the first meshing component.

* * * * *